US010096244B2

(12) United States Patent
Ho et al.

(10) Patent No.: US 10,096,244 B2
(45) Date of Patent: Oct. 9, 2018

(54) ROADSIDE DETECTION SYSTEM, ROADSIDE UNIT AND ROADSIDE COMMUNICATION METHOD THEREOF

(71) Applicant: Industrial Technology Research Institute, Hsinchu (TW)

(72) Inventors: Kai-Yun Ho, Hsinchu (TW); An-Kai Jeng, Taiwan (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 15/401,353

(22) Filed: Jan. 9, 2017

(65) Prior Publication Data

US 2018/0068562 A1 Mar. 8, 2018

(30) Foreign Application Priority Data

Sep. 6, 2016 (TW) .............................. 105128762 A (51) Int. Cl.
*G08G 1/09* (2006.01)
*G08G 1/0967* (2006.01)
(Continued)

(52) U.S. Cl.
CPC ...... *G08G 1/096783* (2013.01); *G01S 5/0054* (2013.01); *G01S 13/91* (2013.01);
(Continued)

(58) Field of Classification Search
CPC .... G08G 1/096783; G08G 1/052; G08G 1/04; G08G 1/056; G01S 19/14; G01S 13/91; H04W 4/20
See application file for complete search history.

(56) References Cited

U.S. PATENT DOCUMENTS 8,922,391 B2 12/2014 Rubin et al.
8,990,001 B2 3/2015 Goudy et al.
(Continued)

FOREIGN PATENT DOCUMENTS

CN 101067902 A 11/2007
CN 102339531 A 2/2012
(Continued)

OTHER PUBLICATIONS

Cooperative Vehicle Positioning via V2V Communications and Onboard Sensors, Sae Fujii, Atsushi Fujita, Takaaki Umedu, Shigeru Kaneda, Hirozumi Yamaguchi, Teruo Higashino, Mineo Takai, Vehicular Technology Conference (VTC Fall), 2011 IEEE ,Sep. 5, 2011,5.

(Continued)

*Primary Examiner* — Erin M File
(74) *Attorney, Agent, or Firm* — Mintz Levin Cohn Ferris Glovsky and Popeo, P.C.; Peter F. Corless; Steven M. Jensen (57) ABSTRACT

A roadside detection system, a roadside unit and a roadside communication method are provided. The roadside unit receives a positioning signal from a satellite positioning system and obtains roadside latitude and longitude coordinates and an initialization parameter coordinate. The roadside unit receives object information of the object. The roadside unit obtains object latitude and longitude coordinates, an object speed, an object acceleration, an object length, and an object heading/direction based on the roadside latitude and longitude coordinates, the initialization parameter coordinate, and the object information. The roadside unit converts the object latitude and longitude coordinates, the object speed, the object acceleration, the object length, and the object heading/direction into a V2V Basic Safety Message format.

20 Claims, 5 Drawing Sheets

(51) Int. Cl.
| | |
|---|---|
| G01S 13/91 | (2006.01) |
| G01S 19/14 | (2010.01) |
| G08G 1/04 | (2006.01) |
| G08G 1/052 | (2006.01) |
| G08G 1/056 | (2006.01) |
| H04W 4/20 | (2018.01) |
| G01S 5/00 | (2006.01) |
| G08G 1/16 | (2006.01) |
| G01S 5/02 | (2010.01) |
| G01S 13/86 | (2006.01) |
| G01S 13/93 | (2006.01) |

(52) U.S. Cl.
 CPC ............... *G01S 19/14* (2013.01); *G08G 1/04*
 (2013.01); *G08G 1/052* (2013.01); *G08G
 1/056* (2013.01); *G08G 1/163* (2013.01);
 *H04W 4/20* (2013.01); *B60W 2550/408*
 (2013.01); *G01S 5/0284* (2013.01); *G01S
 13/867* (2013.01); *G01S 2013/936* (2013.01);
 *G01S 2205/002* (2013.01)

(56) References Cited

U.S. PATENT DOCUMENTS

| | | |
|---|---|---|
| 2010/0010324 A1 | 1/2010 | Brauker et al. |
| 2012/0101681 A1 | 4/2012 | Wagner |
| 2012/0101704 A1 | 4/2012 | Wagner |
| 2013/0253816 A1 | 9/2013 | Caminiti et al. |
| 2013/0278440 A1 | 10/2013 | Rubin et al. |
| 2014/0184441 A1 | 7/2014 | Hwu et al. |
| 2015/0177003 A1* | 6/2015 | Ho .................. H04W 4/02 701/408 |
| 2015/0287323 A1 | 10/2015 | Wells |
| 2016/0210525 A1 | 7/2016 | Yang et al. |
| 2017/0039850 A1* | 2/2017 | Vanden Berg .......... B60Q 9/00 |
| 2017/0132923 A1* | 5/2017 | Li ..................... G08G 1/0967 |
| 2017/0243485 A1* | 8/2017 | Rubin .............. G08G 1/096791 |
| 2017/0366614 A1* | 12/2017 | Koravadi ......... G08G 1/096708 |

FOREIGN PATENT DOCUMENTS

| | | |
|---|---|---|
| CN | 102431556 A | 5/2012 |
| CN | 104376735 A | 2/2015 |
| CN | 105513425 A | 4/2016 |
| JP | 2014-137321 A | 7/2014 |
| TW | 201020140 A | 6/2010 |

OTHER PUBLICATIONS

Cooperative Collision Avoidance at Intersections: Algorithms and Experiments, Michael R. Hafner, Drew Cunningham, Lorenzo Caminiti, Domitilla Del Vecchio, IEEE Transactions on Intelligent Transportation Systems (vol. 14,Issue: 3 ),Apr. 9, 2013,14.

Design Approach for Anti-collision Mechanism between Vehicle to Vehicle for Improving Safety Operation in Intelligent Transportation System, Pravin Ashtankar, Sanjay Dorle, M..Chakole, Dr. inash G. Keskar, Proceedings of the International Multi Conference of Engineers & Computer Scientists;2009 vol. II, Mar. 18, 2009,4.

Vehicle detection through wireless vehicular communication, Dimitrios Vlastar, Taimoor Abbas, Daniel Leston, Fredrik Tufvesson, EURASIP Journal on Wireless Communications and Networking2014, Sep. 9, 2014,8.

Multi-Sensor Data Fusion for Checking Plausibility of V2V Communications by Vision-based Multiple-Object Tracking, Marcus Obst, Laurens Hobert : Pierre Reisdorf, 2014 IEEE Vehicular Networking Conference (VNC), Nov. 1, 2013,8.

Roadside range sensors for intersection decision support, A. Menon , A. Gorjestani ,C. Shankwitz ,M. Donath, 2004 IEEE Intelligent Transportation Systems Conference, Oct. 3, 2004,6.

Extended European Search Report for European Patent Application No. 17150523.3 (dated Jul. 14, 2017).

D. Vlastaras et al., "Universal Medium Range Radar and IEEE 802.11p Modem Solution for Integrated Traffic Safety," 13th International Conference on ITS Telecommunications (TST), Nov. 5-7, 2013, pp. 193-197.

K. Chen et al., "Object Detection for Neighbor Map Construction in an IoV System," 2014 IEEE International Conference on Internet of Things (iThings 2014), Sep. 1-3, 2014, pp. 300-303.

\* cited by examiner

ROADSIDE DETECTION SYSTEM, ROADSIDE UNIT AND ROADSIDE COMMUNICATION METHOD THEREOF

CROSS-REFERENCE TO RELATED APPLICATION

The present disclosure is based on, and claims priority from, Taiwan Application Number 105128762, filed Sep. 6, 2016, the disclosure of which is hereby incorporated by reference herein in its entirety.

TECHNICAL FIELD

The disclosure relates to a roadside detection system, a roadside unit and a roadside communication method thereof.

BACKGROUND

Connected vehicle communication technology can be applied to active road safety. In a connected vehicle network environment, many applications of the connected vehicle communication technology require vehicle statuses to be broadcasted, such as Intersection Movement Assist (IMA), Left Turn Assist (LTA), Lane change warning (LCW), Forward Collision Warning (FCW) and Electronic Emergency Brake Light (EEBL), via a standard inter-vehicle Basic Safety Message (BSM). Vehicle communication mode includes Vehicle-to-Vehicle (V2V), Vehicle-to-Roadside (V2R) and Vehicle-to-Infrastructure (V2I), or the so-called V2X communication. Wireless Access in Vehicular Environments (WAVE)/Dedicated Short Range Communications (DSRC) is a communication technique applied to the V2X communication.

Advanced Driver Assistance Systems (ADAS) assists in driving a vehicle. However, in an ADAS system, the Non-Line-Of-Sight (NLOS) problem cannot be solved. In a road safety application, crossroad collision and forward vehicle's abrupt stop belong to NLOS accidents.

In recent years, roadside unit safety application has become a popular issue. According to the data from National Highway Traffic Safety Administration (NHTSA), the majority of accidents occurs at a crossroad. NHTSA and Depart of Transportation published an Advance Notice of Proposed Rulemaking (ANPRM) to prompt the Government to legislate that the vehicles running in the United States shall be equipped with the V2V technology. In the near future, compact cars and pickups are required to have the V2V function. The V2V application has to be operated in an environment in which all vehicles are equipped with an On-Board Unit (OBU). However, many vehicles, pedestrians and even other moving objects do not have any OBU equipped. Therefore, accidents are more likely to occur at crossroads, and crossroad safety is severely affected.

SUMMARY

An exemplary embodiment of the disclosure provides a roadside detection system. The roadside detection system includes at least one sensor and a roadside unit. The sensor detects at least one object within a detection range, and transmits object information of the object that includes information of the object detected by the sensor at at least two time points. The roadside unit receives a positioning signal from a satellite positioning system to obtain roadside latitude and longitude coordinates and an initialization parameter coordinate of the roadside unit. The roadside unit receives the object information of the object from the sensor, and obtains object latitude and longitude coordinates, an object speed, an object acceleration, an object length and an object heading/direction of the object according to the roadside latitude and longitude coordinates, the initialization parameter coordinate and the object information. The roadside unit converts the object latitude and longitude coordinates, the object speed, the object acceleration, the object length and the object heading/direction of the object into a Vehicle-to-Vehicle Basic Safety Message format.

An exemplary embodiment of the disclosure provides a roadside unit. The roadside unit includes a positioning signal receiver circuit, a storage circuit and a processing circuitry. The positioning signal receiver circuit receives a positioning signal from a satellite positioning system to obtain roadside latitude and longitude coordinates and an initialization parameter coordinate of the roadside unit. The storage circuit has a vehicle-to-vehicle format conversion module. The processing circuitry is coupled to the positioning signal receiver circuit and the storage circuit, and receives object information of at least one object from at least one sensor, wherein the object information includes information of the object detected by the sensor at at least two time points. The processing circuitry obtains object latitude and longitude coordinates, an object speed, an object acceleration, an object length and an object heading/direction of the object according to the roadside latitude and longitude coordinates, the initialization parameter coordinate and the object information. The vehicle-to-vehicle format conversion module converts the object latitude and longitude coordinates, the object speed, the object acceleration, the object length and the object heading/direction of the object into a Vehicle-to-Vehicle Basic Safety Message format.

An exemplary embodiment of the disclosure provides a roadside communication method for a roadside unit. The roadside communication method includes: receiving a positioning signal from a satellite positioning system to obtain roadside latitude and longitude coordinates and an initialization parameter coordinate of the roadside unit; receiving, from at least one sensor, object information of at least one object that includes information of the object detected by the sensor at at least two time points; calculating object latitude and longitude coordinates, an object speed, an object acceleration, an object length and an object heading/direction of the object according to the roadside latitude and longitude coordinates, the initialization parameter coordinate and the object information; converting the object latitude and longitude coordinates, the object speed, the object acceleration, the object length and the object heading/direction of the object into a Vehicle-to-Vehicle Basic Safety Message format; and broadcasting the Vehicle-to-Vehicle Basic Safety Message in a Roadside-to-Vehicle communication mode.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

Figure 1:
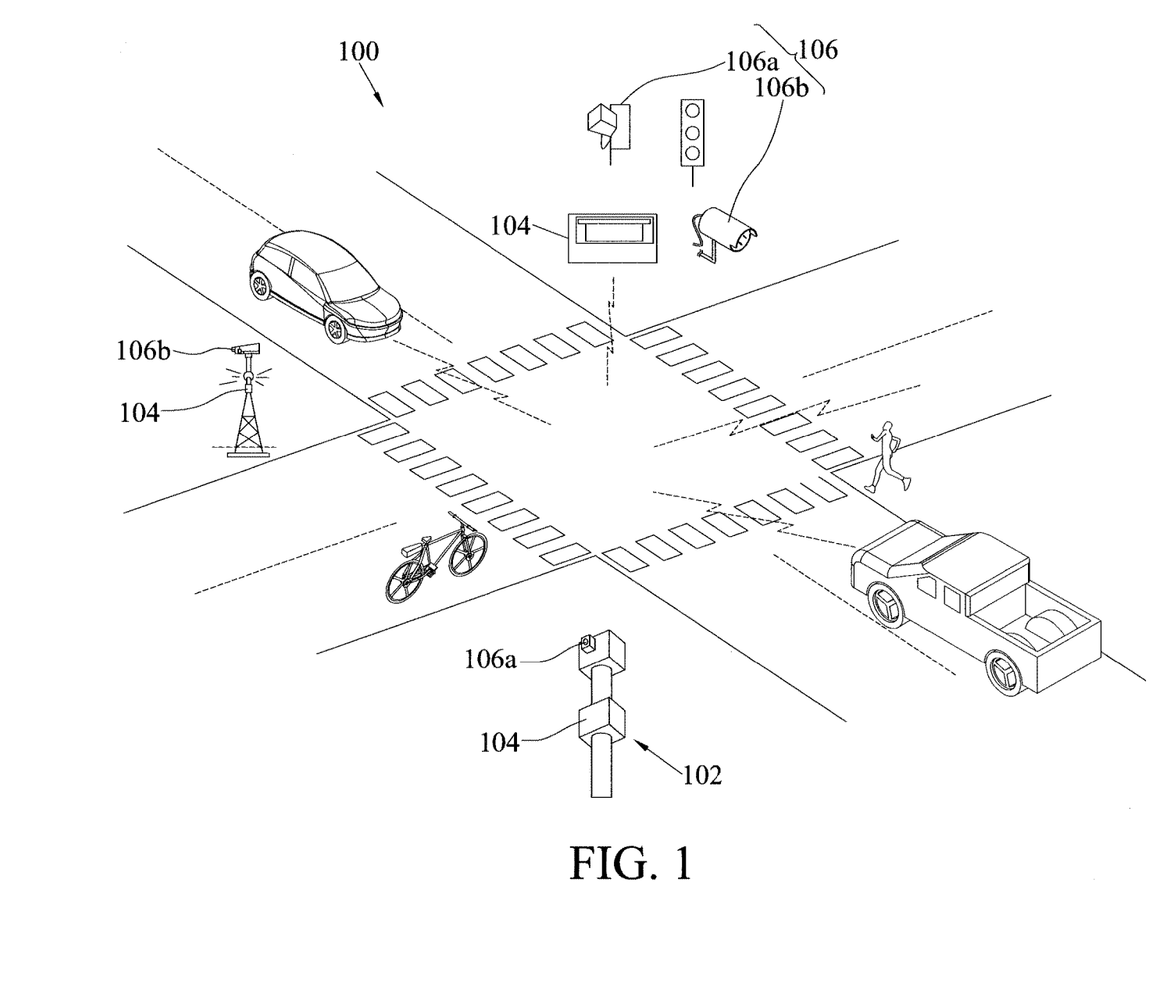
FIG. 1 is a schematic diagram illustrating the operation of a roadside detection system according to an exemplary embodiment of the disclosure.

FIG. 1 is a schematic diagram illustrating the operation of a roadside detection system 100 according to an exemplary embodiment of the disclosure.

The roadside detection system 100 includes a roadside infrastructure 102. The roadside infrastructure 102 includes a roadside unit (RSU) 104 and at least one sensor 106. The sensor 106 may be a sensing device, such as a radar 106a, a camera 106b or a combination thereof. The sensor 106 may be equipped on the roadsides or at crossroads. The sensor 106 detects at least one object within a detection range, and collects object information of the object at at least two time points t1 and t2. For example, the sensor 106 detects, but not limited to, cars, motorbikes, bicycles or pedestrians within the detection range.

The roadside unit 104 receives positioning signals from a satellite positioning system to obtain roadside latitude and longitude coordinates (RSU_lat, RSU_long) and initialization parameter coordinates (BX, BY) of the roadside unit 104. The roadside latitude and longitude coordinates (RSU_lat, RSU_long) are absolute position coordinates of the roadside unit 104. The roadside unit 104 receives and collects object information of the object detected by the sensor 106 at at least two time points t1 and t2 over wired or wireless networks, and obtains object latitude and longitude coordinates, an object speed, an object acceleration, an object length and an object heading/direction of the object according to the roadside latitude and longitude coordinates (RSU_lat, RSU_long) and the object information of the object. The roadside unit 104 then converts the object latitude and longitude coordinates, the object speed, the object acceleration, the object length and the object heading/direction of the object into a standard V2V Basic Safety Message (BSM) format, and broadcasts the V2V message in a Roadside-to-Vehicle (R2V) communication mode.

Figure 2:
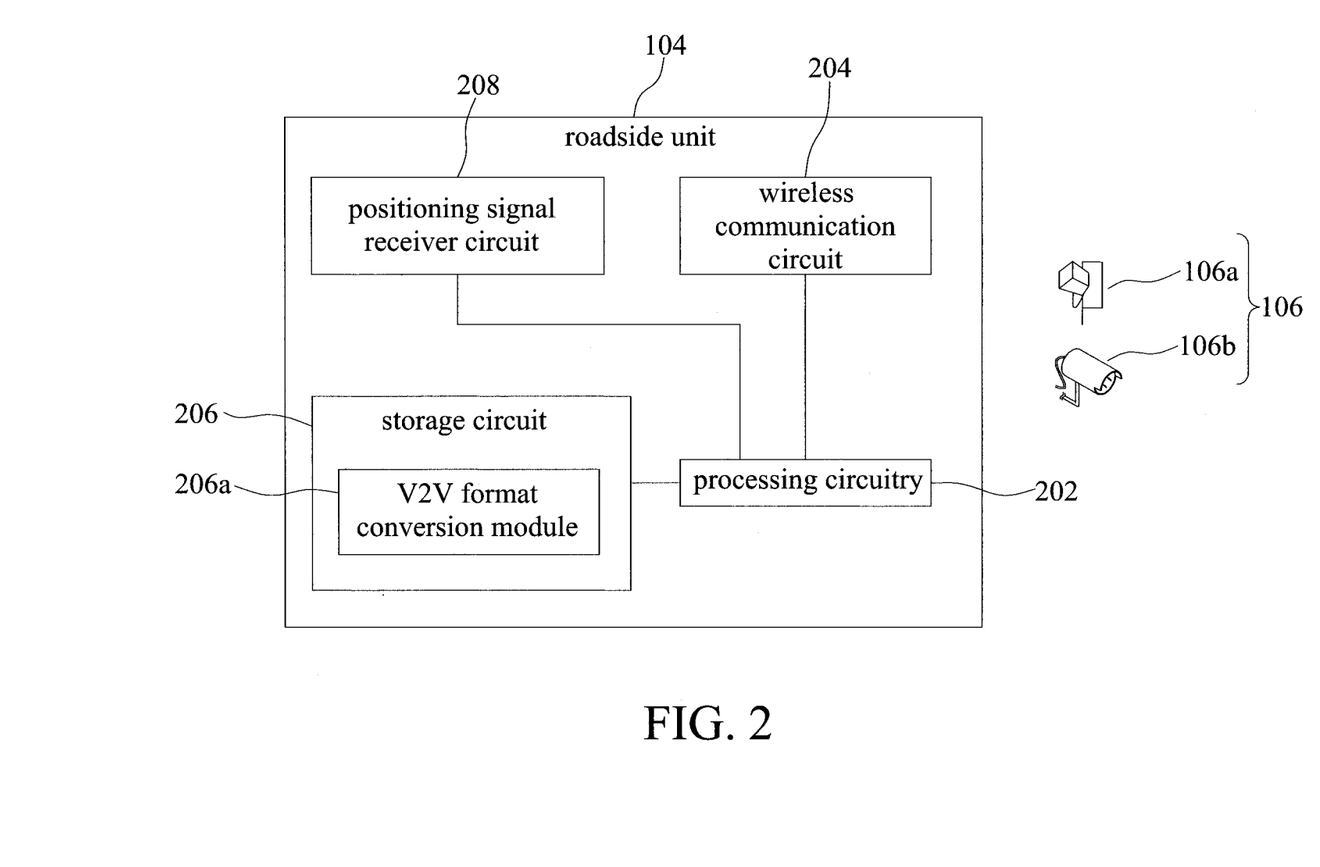
FIG. 2 is a functional block diagram of a roadside unit according to an exemplary embodiment of the disclosure.

FIG. 2 is a functional block diagram of a roadside unit 104 according to an exemplary embodiment of the disclosure.

The roadside unit 104 includes a processing circuitry 202, a wireless communication circuit 204, a storage circuit 206 and a positioning signal receiver circuit 208.

In the exemplary embodiment, the processing circuitry 202 controls the operation of the roadside unit 104. The processing circuitry 202 is, for example, but not limited to, a central processing unit (CPU), a programmable microprocessor, a digital signal processor (DSP), a programmable controller, an application specific integrated circuits (ASIC), a programmable logic device (PLD), or the like. The positioning signal receiver circuit 208 is coupled to the processing circuitry 202, and receives positioning signals from satellites of a satellite positioning system. The positioning signal receiver circuit 208 supports communication protocols of, for example, a Global Positioning System (GPS), an Assisted Global Positioning system (AGPS), a Galileo positioning system or a Global Navigation Satellite System (GLONASS). The wireless communication circuit 204 is coupled to the processing circuitry 202 and broadcasts V2V messages. The wireless communication circuit 204 may further receive object information of each object detected by the sensor 106 when the roadside unit 104 and the sensor 106 are equipped at different positions or the roadside unit 104 and the sensor 106 communicate over the wireless network. The wireless communication circuit 204 is a communication chip supporting, for example, a Global System for Mobile Communication (GSM) system, a Personal Handy-phone System (PHS), a Code Division Multiple Access (CDMA) system, a Wireless Fidelity (WiFi) system, a Worldwide Interoperability for Microwave Access (Wi-MAX) system, Third-Generation Wireless communication technology (3G), Long Term Evolution (LTE), Wireless Access in Vehicular Environments/Dedicated Short Range Communication (WAVE/DSRC), and a combination thereof. The storage circuit 206 is coupled to the processing circuitry 202 and stores program codes of the roadside unit 104 and the received object information. The storage circuit 206 is, for example, a storage device, such as a hard drive and a flash memory.

In the exemplary embodiment, the roadside unit 104 converts the object latitude and longitude coordinates, the object speed, the object acceleration, the object length and the object heading/direction of the object into a standard V2V Basic Safety Message (BSM) format via a vehicle-to-vehicle (V2V) format conversion module 206a having program codes. The V2V format conversion module 206a is implemented by, for example, software, and is stored in the storage circuit 206. In the operation of the roadside unit 104, the processing circuitry 202 loads the program codes of the V2V format conversion module 206a from the storage circuit 206, and executes the function of converting the object latitude and longitude coordinates, the object speed, the object acceleration, the object length and the object heading/direction of the object into the standard V2V Basic Safety Message (BSM) format. However, it should be understood that the disclosure is not limited thereto. In another exemplary embodiment, the function of converting the object latitude and longitude coordinates, the object speed, the object acceleration, the object length and the object heading/direction of the object into the standard V2V Basic Safety Message (BSM) format can also be implemented in a hardware circuit such as the processing circuitry 202.

In an exemplary embodiment, the sensor 106 may be an equipment, such as a radar 106a, a camera 106b or a combination thereof. The object information detected by the sensor 106 includes, but not limited to, a relative position and a relative speed between the object and the roadside unit, and object lengths of the object. In an embodiment that the sensor 106 is a radar 106a, the radar 106a detects all objects within a detection range via radar detection technology to obtain object information of the objects detected. The object information may include a relative position (a relative movement coordinate) and a relative speed between the objects and the roadside unit 104, and object lengths of the objects. The roadside unit 104 receives object information of each object at at least two time points transmitted from the radar 106*a*, converts each relative position of each object at the at least two time points into object latitude and longitude coordinates of the two time points, and further obtains an object speed, an object acceleration, an object length and an object heading/direction of each object according to the object latitude and longitude coordinates and the object information. However, it should be understood that it is one example to use the radar detection technology to detect an object, and the disclosure is not limited thereto.

In an embodiment in which the sensor 106 is the camera 106*b*, by using image identification technology, the camera 106*b* identifies objects from images that it captures, obtains object information of the objects, calculates the relative position and the relative speed of the objects and the roadside unit 104, and object information such as an object length of the object, and transmits the object information of the objects to the roadside unit 104. In another embodiment, the roadside unit 104 acquires the GPS coordinate of the camera 106*b* in advance, and receives image information from the camera 106*b*. The roadside unit 104 then identifies the objects in the images by the image identification technology, calculates the relative position and the relative speed of the object and the roadside unit 104, and object information such as object length of the object, and further obtains the object latitude and longitude coordinates, the object speed, the object acceleration, the object length and the object heading/direction of the objects. However, it should be understood that the disclosure does not limit the configuration of the sensor 106, and any sensor can be used in the disclosure as long as the sensor can transmit the detected object information to the roadside unit 104, allowing the roadside unit 104 to convert the object latitude and longitude coordinates, the object speed, the object acceleration, the object length and the object heading/direction of the object into a V2V Basic Safety Message format. In other words, the roadside unit 104 encodes the object latitude and longitude coordinates, the object speed, the object acceleration, the object length and object heading/direction into a standard V2V Basic Safety Message format.

Figure 3A:
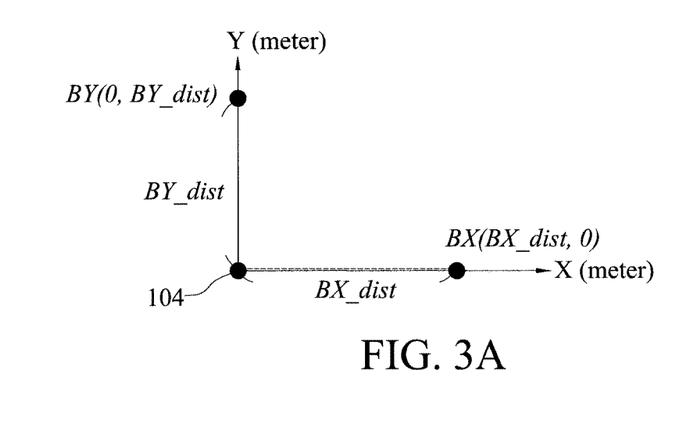
FIG. 3A is a schematic diagram illustrating a relative position of a roadside unit and initialization parameter coordinates according to an exemplary embodiment of the disclosure.

FIG. 3A is a schematic diagram illustrating a relative position of a roadside unit and initialization parameter coordinates according to an exemplary embodiment of the disclosure.

Figure 3B:
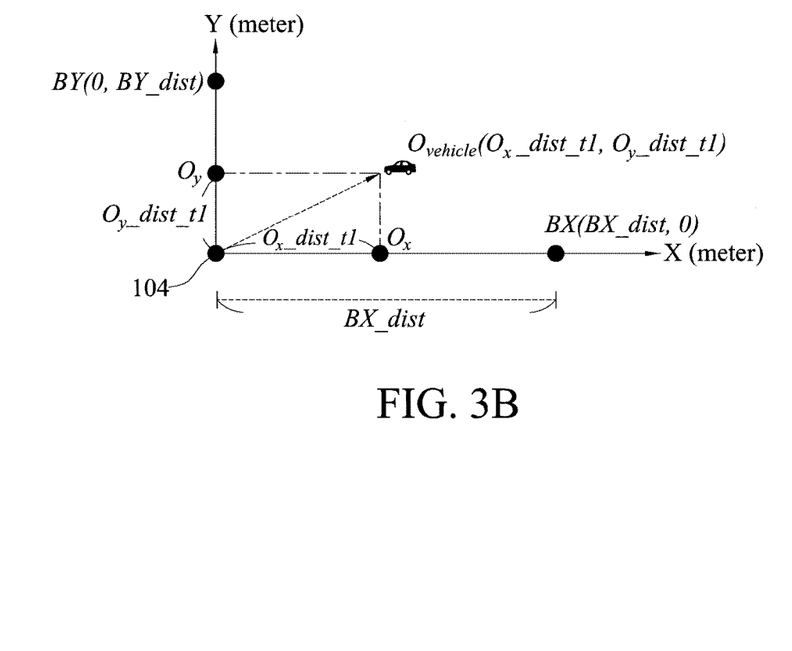
FIG. 3B is a schematic diagram illustrating a relative position of a vehicle and a roadside unit and an initialization parameter coordinate according to an exemplary embodiment of the disclosure.

FIG. 3B is a schematic diagram illustrating a relative position of a vehicle and a roadside unit, and initialization parameter coordinates according to an exemplary embodiment of the disclosure.

Referring to FIG. 3A, in the exemplary embodiment, when the roadside unit 104 is in operation, the positioning signal receiver circuit 208 receives positioning signals to obtain roadside latitude and longitude coordinates (RSU_lat, RSU_long) and initialization parameter coordinates (BX, BY) of the roadside unit 104. The reference coordinate parameter BX of the initialization parameter coordinates (BX, BY) takes the roadside unit 104 as a starting point, and obtains the distance BX_dist away from the roadside unit 104 within a distance range such as a range from 10 meters to 100 meters in X-axis direction. The reference coordinate parameter BY of the initialization parameter coordinates (BX, BY) also takes the roadside unit 104 as a starting point, and obtains the distance BY_dist away from the roadside unit 104 within a distance range such as a range from 10 meters to 100 meters in Y-axis direction.

In the exemplary embodiment, the roadside unit 104 receives the objection information of the objects. The object information of each of the objects includes the information of the object detected by the sensor 106 at at least two time points. The processing circuitry 202 of the roadside unit 104 obtains the object latitude and longitude coordinates, the object speed, the object acceleration, the object length and the object heading/direction of the object according to the roadside latitude and longitude coordinates (RSU_lat, RSU_long), the initialization parameter coordinates (BX, BY) and the object information, packages these information into a packet, and transmits the packet via the wireless communication circuit 204 by DSRC communication technology. However, it should be understood that the disclosure is not limited thereto. In another embodiment, the roadside unit 104 may transmit the packet via other communication standards. The following describes how to obtain the object latitude and longitude coordinates, the object speed, the object acceleration, the object length and the object heading/direction of the object.

In the exemplary embodiment, the processing circuitry 202 of the roadside unit 104 calculates the distances (unit: meters) of the roadside unit 104 and the initialization parameter coordinates (BX, BY) away from zero degree longitude and zero degree latitude, respectively. According to the roadside latitude and longitude coordinates (RSU_lat, RSU_long), the roadside unit 104 obtains the distance $R_d\_lat$ of the roadside unit 104 away from zero degree latitude, and the distance $R_d\_long$ of the roadside unit 104 away from zero degree longitude. The distance of the reference coordinate parameter BX away from the roadside unit 104 is BX_dist. The distance of the reference coordinate parameter BX away from zero degree latitude is $BX_d\_lat$. The distance of the reference coordinate parameter BX away from zero degree longitude is $BX_d\_long$. The distance of the reference coordinate parameter BY away from the roadside unit 104 is BY_dist. The distance of the reference coordinate parameter BY away from zero degree latitude is $BY_d\_lat$. The distance of the reference coordinate parameter BY away from zero degree longitude is $BY_d\_long$.

Next, the processing circuitry 202 of the roadside unit 104 calculates the object latitude and longitude coordinates of the object at at least two time points. Referring to FIG. 3B, in an embodiment, in which the first time point t1 is taken as an example, the sensor 106 detects a vehicle $O_{vehicle}$, the object information of which comprises a relative position coordinate ($O_x\_dist\_t1$, $O_y\_dist\_t1$) of the vehicle $O_{vehicle}$ and the roadside unit 104. The processing circuitry 202 calculates distances (unit: meters) of the vehicle $O_{vehicle}$ having the relative position coordinate ($O_x\_dist\_t1$, $O_y\_dist\_t1$) at the first time point t1 away from zero degree longitude and zero degree latitude, respectively. The distances of the vehicle $O_{vehicle}$ along the relative position coordinate $O_x\_dist\_t1$ of the X axis away from zero degree latitude and zero degree longitude are $O_xd\_lat\_t1$ and $O_xd\_long\_t1$, respectively; the distances of the vehicle $O_{vehicle}$ along the relative position coordinate $O_y\_dist\_t1$ of the Y axis away from zero degree latitude and zero degree longitude are $O_yd\_lat\_t1$ and $O_yd\_long\_t1$, respectively, and can be expressed by the following equations (1):

$$\begin{cases} O_x\text{d\_lat\_t1} = \dfrac{(\text{BX\_dist} - O_x\text{\_dist\_t1}) \times R_d\text{\_lat}}{\text{BX\_dist}} + \dfrac{(O_x\text{\_dist\_t1} \times \text{BXd\_lat})}{\text{BX\_dist}} \\ O_x\text{d\_long\_t1} = \dfrac{(\text{BX\_dist} - O_x\text{\_dist\_t1}) \times R_d\text{\_long}}{\text{BX\_dist}} + \dfrac{(O_x\text{\_dist\_t1} \times \text{BXd\_long})}{\text{BX\_dist}} \\ O_y\text{d\_lat\_t1} = \dfrac{(\text{BY\_dist} - O_y\text{\_dist\_t1}) \times R_d\text{\_lat}}{\text{BY\_dist}} + \dfrac{(O_y\text{\_dist\_t1} \times \text{BYd\_lat})}{\text{BY\_dist}} \\ O_y\text{d\_long\_t1} = \dfrac{(\text{BY\_dist} - O_y\text{\_dist\_t1}) \times R_d\text{\_long}}{\text{BY\_dist}} + \dfrac{(O_y\text{\_dist\_t1} \times \text{BYd\_long})}{\text{BY\_dist}} \end{cases}$$

equations (1)

According to the distances $O_x\text{d\_lat\_t1}$ and $O_x\text{d\_lat\_t1}$ of the vehicle $O_{vehicle}$ at the relative position coordinate $O_{x\_}\text{dist\_t1}$ along the X axis away from zero degree latitude and zero degree longitude, respectively, and the distances $O_y\text{d\_lat\_t1}$ and $O_y\text{d\_long\_t1}$ of vehicle $O_{vehicle}$ at the relative position coordinate $O_{y\_}\text{dist\_t1}$ along the Y axis away from zero degree latitude and zero degree longitude, respectively, the roadside unit 104 obtains the distances (unit: meters) of the vehicle $O_{vehicle}$ away from zero degree latitude and zero degree longitude to be $O_d\text{\_lat\_t1}$ and $O_d\text{\_long\_t1}$, respectively, and can be expressed by the following equations:

$$\begin{cases} O_d\text{\_lat\_t1} = R_d\text{\_lat} + (O_x\text{d\_lat\_t1} - R_d\text{\_lat}) + (O_y\text{d\_lat\_t1} - R_d\text{\_lat}) \\ O_d\text{\_long\_t1} = R_d\text{\_long} + (O_x\text{d\_long\_t1} - R_d\text{\_long}) + \\ \quad (O_y\text{d\_long\_t1} - R_d\text{\_long}) \end{cases}$$

equations (2)

Therefore, the roadside unit 104 obtains the object latitude and longitude coordinates, i.e., the absolute longitude and latitude coordinates of the object, at the first time point t1, via the equations (1) and (2), according to the roadside latitude and longitude coordinates (RSU_lat, RSU_long), the initialization parameter coordinates (BX, BY) and the object information (the distances $O_d\text{\_lat\_t1}$ and $O_d\text{\_long\_t1}$ of the vehicle $O_{vehicle}$ away from zero degree longitude and zero degree longitude, respectively). Similarly, the roadside unit 104 obtains the object latitude and longitude coordinates at the second time point t2, via the equations (1) and (2), according to the roadside latitude and longitude coordinates (RSU_lat, RSU_long), the initialization parameter coordinates (BX, BY) and the object information (the distances $O_d\text{\_lat\_t2}$ and $O_d\text{\_long\_t2}$ of the vehicle $O_{vehicle}$ away from zero degree latitude and zero degree longitude, respectively).

Figure 4A:
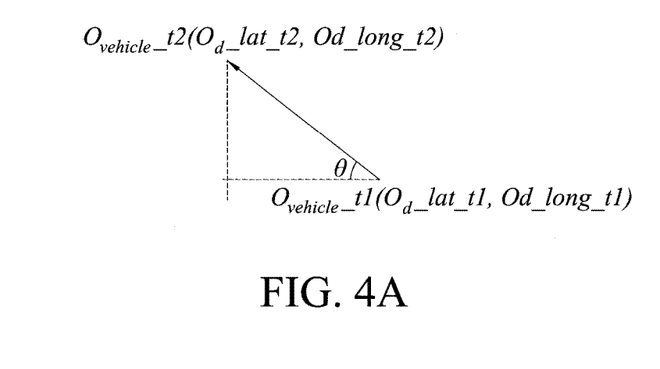
FIG. 4A is a schematic diagram illustrating the positions of a vehicle at a first time point and a second time point according to an exemplary embodiment of the disclosure.

FIG. 4A is a schematic diagram illustrating the position of a vehicle at first time point and second time point according to an exemplary embodiment of the disclosure.

Figure 4B:
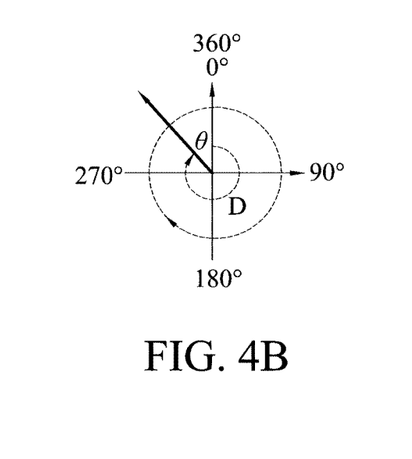
FIG. 4B is a schematic diagram illustrating a vehicle having a moving direction changed to a north heading angle according to an exemplary embodiment of the disclosure.

FIG. 4B is a schematic diagram illustrating a vehicle having a moving direction changed to north heading angle according to an exemplary embodiment of the disclosure.

Please refer to FIGS. 4A and 4B. In an exemplary embodiment, the processing circuitry 202 of the roadside unit 104 obtains, via the equations (1) and (2), the distances $O_d\text{\_lat\_t1}$ and $O_d\text{\_long\_t1}$ of the vehicle $O_{vehicle}$ away from zero degree latitude and zero degree longitude, respectively, at the first time point t1, and the distances $O_d\text{\_lat\_t2}$ and $O_d\text{\_long\_t2}$ of the vehicle $O_{vehicle}$ away from zero degree latitude and zero degree longitude, respectively, at the second time point t2, and changes the moving direction of the vehicle $O_{vehicle}$ to a north heading angle according to the moving direction of the vehicle $O_{vehicle}$, i.e., the moving direction of vehicle $O_{vehicle}$ at the position $O_{vehicle}\text{\_t1}$ of the first time point t1 toward the position $O_{vehicle}\text{\_t2}$ at the second time point t2. For example, the absolute position of Taiwan, i.e., 120-122 degrees east longitude and 22-25 degrees north latitude may be used as a basis to convert the heading angle of the object. However, the disclosure is not limited thereto, and the heading angle of the object is not limited to north.

Please refer to FIG. 4B. In an embodiment, the moving direction of the vehicle $O_{vehicle}$ is changed to be north heading angle D, which is expressed by the following equations (3):

$$\begin{cases} \theta = a\tan\left(\dfrac{|O_d\text{\_lat\_t2} - O_d\text{\_lat\_t1}|}{|O_d\text{\_long\_t2} - O_d\text{\_long\_t1}|}\right) \times \dfrac{180}{\pi} \\ \text{vehicle} O_{vehicle} \text{ moving direction adjusting heading angle } D \\ \text{if heading northeast, } D = 90° - \theta \\ \text{else if heading southeast, } D = 90° + \theta \\ \text{else if heading northwest, } D = 180° + \theta \\ \text{else if heading southeast, } D = 270° + \theta \end{cases}$$

equations (3)

The processing circuitry 202 of the roadside unit 104 calculates the speed and acceleration of the object according to the object information transmitted by the sensor 106. Take the vehicle $O_{vehicle}$ as an example. The roadside unit 104 acquires, from the object information transmitted by the sensor 106, that the relative position coordinate of the vehicle $O_{vehicle}$ at the first time point t1 is ($O_{x\_}\text{dist\_t1}$, $O_{y\_}\text{dist\_t1}$) and the relative position coordinate of the vehicle $O_{vehicle}$ at the second time point t2 is ($O_{x\_}\text{dist\_t2}$, $O_{y\_}\text{dist\_t2}$), and further obtains the object speed V and the object acceleration a of the vehicle $O_{vehicle}$. In another embodiment, if the sensor 106 can detect the relative speed of the object and transmit the relative speed of the object to the roadside unit 104, the roadside unit 104 can obtain the object speed V via the relative speed of the object. For example, the sensor 106 detects that the relative speeds of the vehicle $O_{vehicle}$ at the first time point t1 along the X axis and the Y axis are $V_{x\_t1}$ and $V_{y\_t1}$, respectively, and the roadside unit 104 can thus calculate the speed V_t1 and the acceleration a of the vehicle $O_{vehicle}$. The speed V_t1 can be expressed by the following equation (4):

$$V\_t1 = \sqrt{V_{x\_t1}^2 + V_{y\_t1}^2}$$

equation (4)

The roadside unit 104 obtains, via the equation (4), the speeds V_t1 and V_t2 of the vehicle $O_{vehicle}$ at the first time point t1 and the second time point t2, respectively, and then obtains the acceleration a of the vehicle $O_{vehicle}$ via the following equation (5):

$$a = \frac{V\_t2 - V\_t1}{t2 - t1} \quad \text{equation (5)}$$

The roadside unit 104 stores the received object information and the object latitude and longitude coordinates, the object speed, the object acceleration, the object length and the object heading/direction of the object in the storage circuit 206. By the V2V format conversion module 206a, the processing circuitry 202 of the roadside unit 104 converts, the object latitude and longitude coordinates, the object speed, the object acceleration, the object length and the object heading/direction of the object into a standard V2V Basic Safety Message (BSM) format, and the roadside unit 104 broadcasts the V2V messages in the Roadside-to-Vehicle (R2V) communication mode.

In an embodiment, the sensor 106 and the roadside unit 104 are equipped at the same position. In another embodiment, the sensor 106 can be built in the roadside unit 104. As such, the sensor 106 and the roadside unit 104 have identical GPS coordinates. Therefore, the sensor 106 transmits the detected object information including the relative position and the relative speed of the object and the roadside unit and the object lengths of the object to the roadside unit 104, and the roadside unit 104 can obtain the object latitude and longitude coordinates, the object speed, the object acceleration and the object heading/direction of the object, based on the above description. In another embodiment, the sensor 106 and the roadside unit 104 are equipped at different positions. As such, the roadside unit 104 can acquire the GPS coordinate of the sensor 106 in advance, or receives the GPS coordinate and the object information from the sensor 106. Therefore, the roadside unit 104 can obtain the object latitude and longitude coordinates, the object speed, the object acceleration, the object length and the object heading/direction of the object according to the GPS coordinate of the sensor 106 and the object information received by the sensor 106.

Accordingly, a vehicle equipped with an On-board Unit (OBU) and configured to receive V2V messages can receive packets transmitted from the roadside unit 104 that comprise V2V Basic Safety Message format. Therefore, the vehicle equipped with the OBU can be made aware of all the coming objects (e.g., cars, motorbikes, bicycles, or pedestrians) via the received V2V Basic Safety Message. The vehicle equipped with the OBU can then release a warning message if it determines that the coming object is too close in order to protect itself from colliding with the object. Therefore, with the roadside unit 104 that converts the object information at the crossroads into the V2V Basic Safety Message and informs vehicles nearby of the V2V Basic Safety Message, the problems due to low popularity of the OBU and that not every vehicle or object has the function of transmitting the V2V Basic Safety Message are solved.

Figure 5:
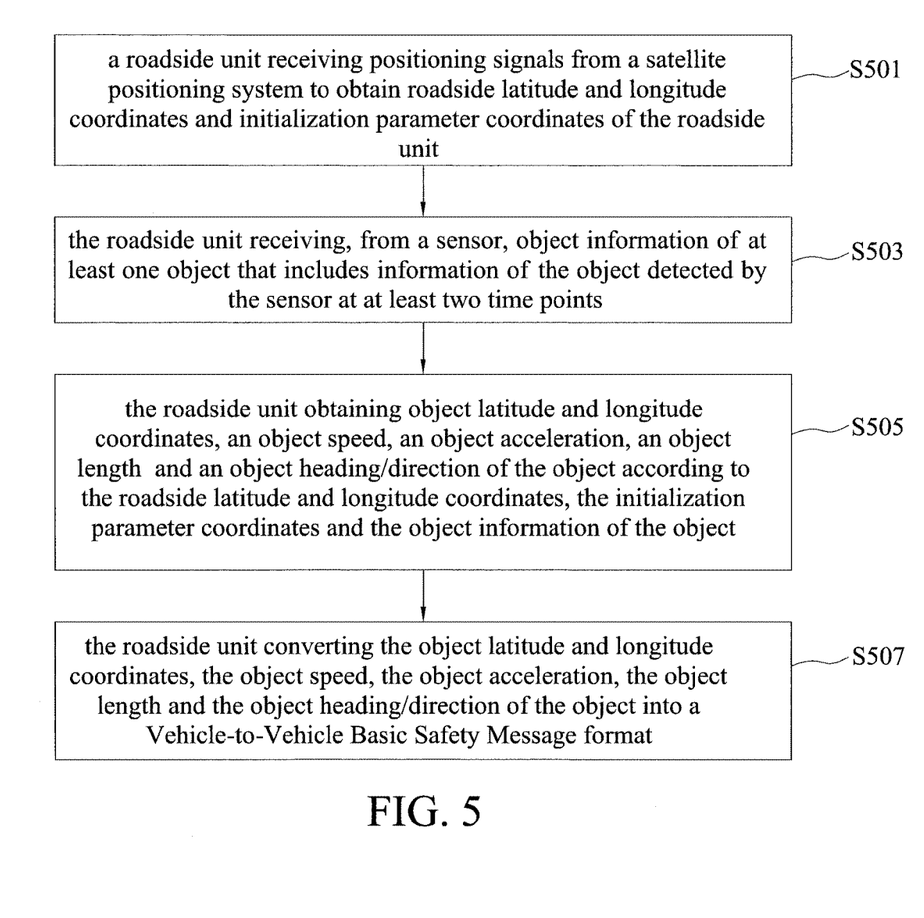
FIG. 5 is a flow chart of a roadside communication method according to an exemplary embodiment of the disclosure.

FIG. 5 is a flow chart of a roadside communication method according to an exemplary embodiment of the disclosure.

In step S501, the roadside unit 104 receives positioning signals from a satellite positioning system to obtain roadside latitude and longitude coordinates (RSU_lat, RSU_long) and initialization parameter coordinates (BX, BY) of the roadside unit. In step S503, the roadside unit 104 receives, from the sensor 106, object information of at least one object that includes information of the object detected by the sensor 106 at at least two time points. In step S505, the roadside unit 104 obtains object latitude and longitude coordinates, an object speed, an object acceleration, an object length and an object heading/direction of the object according to the roadside latitude and longitude coordinates (RSU_lat, RSU_long), the initialization parameter coordinates (BX, BY) and the object information of the object. In step S507, the roadside unit 104 converts the object latitude and longitude coordinates, the object speed, the object acceleration, the object length and the object heading/direction of the object into a Vehicle-to-Vehicle Basic Safety Message format.

The roadside detection system, the roadside unit and the roadside communication method in the exemplary embodiments employ the roadside unit to detect objects and release V2V messages, such that neighboring vehicles or objects can be made aware of one another via the V2V messages from the roadside unit, thereby reducing the occurrence of accidents, and solving the problem caused by the low popularity of the OBU.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A roadside detection system, comprising:
    at least one sensor configured to detect at least one object within a detection range and transmit object information of the object, wherein the object information includes information of the object detected by the sensor at at least two time points; and
    a roadside unit configured to receive a positioning signal from a satellite positioning system and obtain roadside latitude and longitude coordinates and an initialization parameter coordinate of the roadside unit,
    wherein the roadside unit receives the object information of the object from the sensor, and obtains object latitude and longitude coordinates, an object speed, an object acceleration, an object length and an object heading/direction of the object according to the roadside latitude and longitude coordinates, the initialization parameter coordinate and the object information, and
    wherein the roadside unit converts the object latitude and longitude coordinates, the object speed, the object acceleration, the object length and the object heading/direction of the object into a Vehicle-to-Vehicle Basic Safety Message format.

2. The roadside detection system of claim 1, wherein the roadside unit includes a processing circuitry, a wireless communication circuit, a positioning signal receiver circuit and a vehicle-to-vehicle format conversion module, and the processing circuitry converts, via the vehicle-to-vehicle format conversion module, the object latitude and longitude coordinates, the object speed, the object acceleration, the object length and the object heading/direction of the object into the Vehicle-to-Vehicle Basic Safety Message format.

3. The roadside detection system of claim 1, wherein the sensor includes at least one radar or at least one camera, and employs radar detection technology or image identification technology to detect the object within the detection range and obtain the object information.

4. The roadside detection system of claim 1, wherein the object information includes a relative position and a relative speed of the object and the roadside unit and the object length of the object.

5. The roadside detection system of claim 4, wherein the roadside unit is configured to calculate distances of the roadside unit away from zero degree longitude and zero degree latitude, respectively, according to the roadside latitude and longitude coordinates and the initialization parameter coordinate, and calculate distances of the initialization parameter coordinate away from the zero degree longitude and the zero degree latitude, respectively, according to the roadside latitude and longitude coordinates and the initialization parameter coordinate,     wherein the roadside unit obtains distances of the object away from the zero degree longitude and the zero degree latitude, respectively, according to the relative position of the object, and     wherein the roadside unit obtains the object latitude and longitude coordinates according to the roadside latitude and longitude coordinates, the initialization parameter coordinate and the distances of the object away from the zero degree longitude and the zero degree latitude.

6. The roadside detection system of claim 5, wherein the roadside unit obtains the distances of the object away from the zero degree longitude and the zero degree latitude at a first time point and a second time point of the at least two time points, respectively, and obtains the object heading/direction of the object according to the distances of the object away from the zero degree longitude and the zero degree latitude.

7. The roadside detection system of claim 4, wherein the roadside unit obtains the object speed and the object acceleration of the object according to the relative speed of the object at a first time point and a second time point of the at least two time points, respectively.

8. The roadside detection system of claim 1, wherein the roadside unit broadcasts the Vehicle-to-Vehicle Basic Safety Message in a Roadside-to-Vehicle communication mode.

9. A roadside unit, comprising:

a positioning signal receiver circuit configured to receive a positioning signal from a satellite positioning system to obtain roadside latitude and longitude coordinates and an initialization parameter coordinate of the roadside unit;

a storage circuit including a vehicle-to-vehicle format conversion module; and     a processing circuitry coupled to the positioning signal receiver circuit and the storage circuit,     wherein the processing circuitry receives object information of at least one object from at least one sensor, wherein the object information includes information of the object detected by the sensor at at least two time points,     wherein the processing circuitry obtains object latitude and longitude coordinates, an object speed, an object acceleration, an object length and an object heading/direction of the object according to the roadside latitude and longitude coordinates, the initialization parameter coordinate and the object information, and     wherein the processing circuitry converts the object latitude and longitude coordinates, the object speed, the object acceleration, the object length and the object heading/direction of the object into a Vehicle-to-Vehicle Basic Safety Message format via the vehicle-to-vehicle format conversion module.

10. The roadside unit of claim 9, wherein the object information includes a relative position and a relative speed of the object and the roadside unit and the object length.

11. The roadside unit of claim 10, which is configured to calculate distances of the roadside unit away from zero degree longitude and zero degree latitude, respectively, according to the roadside latitude and longitude coordinates and the initialization parameter coordinate, and calculate distances of the initialization parameter coordinate away from the zero degree longitude and the zero degree latitude, respectively, according to the roadside latitude and longitude coordinates and the initialization parameter coordinate,     wherein the roadside unit obtains distances of the object away from the zero degree longitude and the zero degree latitude, respectively, according to the relative position of the object, and     wherein the roadside unit obtains the object latitude and longitude coordinates according to the roadside latitude and longitude coordinates, the initialization parameter coordinate and the distances of the object away from the zero degree longitude and the zero degree latitude.

12. The roadside unit of claim 11, which is configured to obtain the distances of the object away from the zero degree longitude and the zero degree latitude at a first time point and a second time point of the at least two time points, respectively, and obtain the object heading/direction of the object according to the distances of the object away from the zero degree longitude and the zero degree latitude.

13. The roadside unit of claim 10, which is configured to obtain the object speed and the object acceleration of the object according to the relative speed of the object at a first time point and a second time point of the at least two time points, respectively.

14. The roadside unit of claim 9, further comprising a wireless communication circuit configured to broadcast the Vehicle-to-Vehicle Basic Safety Message in a Roadside-to-Vehicle communication mode.

15. The roadside unit of claim 14, wherein the wireless communication circuit is coupled to the processing circuitry and configured to receive the object information of the at least one object from the at least one sensor.

16. A roadside communication method for a roadside unit, the roadside communication method comprising:

receiving a positioning signal from a satellite positioning system to obtain roadside latitude and longitude coordinates and an initialization parameter coordinate of the roadside unit;

receiving, from at least one sensor, object information of at least one object, wherein the object information comprises information of the object detected by the sensor at at least two time points;

calculating object latitude and longitude coordinates, an object speed, an object acceleration, an object length and an object heading/direction of the object according to the roadside latitude and longitude coordinates, the initialization parameter coordinate and the object information;

converting the object latitude and longitude coordinates, the object speed, the object acceleration, the object length and the object heading/direction of the object into a Vehicle-to-Vehicle Basic Safety Message format; and     broadcasting the Vehicle-to-Vehicle Basic Safety Message in a Roadside-to-Vehicle communication mode.

17. The roadside communication method of claim 16, wherein the object information includes a relative position and a relative speed of the object and the roadside unit and the object length.

18. The roadside communication method of claim 17, further comprising calculating distances of the roadside unit away from zero degree longitude and zero degree latitude, respectively, according to the roadside latitude and longitude coordinates and the initialization parameter coordinate, and calculating distances of the initialization parameter coordinate away from the zero degree longitude and the zero degree latitude, respectively, according to the roadside latitude and longitude coordinates and the initialization parameter coordinate, wherein the roadside unit obtains distances of the object away from the zero degree longitude and the zero degree latitude, respectively, according to the relative position of the object, and wherein the roadside unit obtains the object latitude and longitude coordinates according to the roadside latitude and longitude coordinates, the initialization parameter coordinate and the distances of the object away from the zero degree longitude and the zero degree latitude.

19. The roadside communication method of claim 18, further comprising obtaining the distances of the object away from the zero degree longitude and the zero degree latitude at a first time point and a second time point of the at least two time points, respectively, and obtaining the object heading/direction of the object according to the distances of the object away from the zero degree longitude and the zero degree latitude.

20. The roadside communication method of claim 17, further comprising obtaining the object speed and the object acceleration of the object according to the relative speed of the object at a first time point and a second time point of the at least two time points, respectively.

* * * * *